United States Patent
Fujikawa et al.

(10) Patent No.: US 11,366,695 B2
(45) Date of Patent: Jun. 21, 2022

(54) SYSTEM AND METHOD FOR ASSISTING CHARGING TO USE OF ACCELERATOR UNIT

(71) Applicant: HITACHI, LTD., Tokyo (JP)

(72) Inventors: Yoshifumi Fujikawa, Tokyo (JP); Kazuhisa Fujimoto, Tokyo (JP); Toshiyuki Aritsuka, Tokyo (JP); Kazushi Nakagawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 958 days.

(21) Appl. No.: 16/125,145

(22) Filed: Sep. 7, 2018

(65) Prior Publication Data

US 2019/0129755 A1    May 2, 2019

(30) Foreign Application Priority Data

Oct. 30, 2017   (JP) .............................. JP2017-209359

(51) Int. Cl.
   *G06F 9/50* (2006.01)
   *H04L 41/5054* (2022.01)
   *H04L 47/78* (2022.01)

(52) U.S. Cl.
   CPC ............ *G06F 9/5022* (2013.01); *G06F 9/505* (2013.01); *G06F 9/5044* (2013.01); *H04L 41/5054* (2013.01); *H04L 47/78* (2013.01); *G06F 2209/508* (2013.01)

(58) Field of Classification Search
   None
   See application file for complete search history.

(56) References Cited

U.S. PATENT DOCUMENTS

| | | | |
|---|---|---|---|
| 7,984,412 B1 * | 7/2011 | Schumacher | G06F 30/34 716/108 |
| 2011/0010721 A1 * | 1/2011 | Gupta | G06F 9/5077 718/1 |
| 2012/0123764 A1 * | 5/2012 | Ito | G06F 9/5055 703/21 |
| 2012/0293519 A1 * | 11/2012 | Ribble | G06T 15/005 345/501 |

(Continued)

FOREIGN PATENT DOCUMENTS

JP    2015-014868 A    1/2015

*Primary Examiner* — Adam Lee
(74) *Attorney, Agent, or Firm* — Volpe Koenig

(57) ABSTRACT

A charging assistant system that assists charging for use of an accelerator unit, which is one or more accelerators, includes an operation amount obtaining unit, an acceleration rate estimation unit, and a use fee determination unit. For each of one or more commands input into the accelerator unit, the operation amount obtaining unit obtains the amount of operation related to execution of the command from a response output from the accelerator unit for the command. For the one or more commands input into the accelerator unit, the acceleration rate estimation unit estimates an acceleration rate on the basis of command execution time that is time required for processing of the one or more commands, and one or more amounts of operation obtained for the one or more commands respectively. The use fee determination unit determines a use fee of the accelerator unit on the basis of the estimated acceleration rate.

4 Claims, 5 Drawing Sheets

(56) References Cited

U.S. PATENT DOCUMENTS

| | | | |
|---|---|---|---|
| 2013/0185725 A1* | 7/2013 | Abdalla | G06F 9/505 718/102 |
| 2014/0022266 A1* | 1/2014 | Metz | G06F 9/461 345/522 |
| 2015/0130820 A1* | 5/2015 | Shu | G06T 1/20 345/502 |
| 2015/0199214 A1* | 7/2015 | Lee | G06F 9/505 718/102 |
| 2015/0199963 A1* | 7/2015 | Maaninen | G10L 15/16 704/232 |
| 2017/0109801 A1* | 4/2017 | Devendra | G06Q 30/04 |
| 2018/0047204 A1* | 2/2018 | Heo | G06T 19/20 |
| 2018/0373540 A1* | 12/2018 | Bao | G06F 9/5038 |
| 2018/0374187 A1* | 12/2018 | Dong | G06T 1/20 |

* cited by examiner

| COUNTER ID | WEIGHTING FACTOR |
|---|---|
| A | $w_1$ |
| B | $w_2$ |
| C | $w_3$ |
| D | $w_4$ |
| E | $w_5$ |

| ACCELERATION RATE RANGE | UNIT PRICE |
|---|---|
| $r < r_1$ | $k_1$ |
| $r_1 \leq r < r_2$ | $k_2$ |
| $r_2 \leq r < r_3$ | $k_3$ |
| $r_3 \leq r$ | $k_4$ |

SYSTEM AND METHOD FOR ASSISTING CHARGING TO USE OF ACCELERATOR UNIT

BACKGROUND OF THE INVENTION

1. Field of the Invention

Generally, the present invention relates to assisting charging for use of an accelerator unit that includes one or more accelerators.

2. Description of the Related Art

In general, in a cloud service, a user is charged on the basis of an amount of resources, such as a CPU and a memory, that are assigned to the user, and an operating time of the resources.

In the charging system disclosed in JP 2015-14868 A, in a case where a usage rate of resources used by a virtual machine is lower than a reference value, a charged amount of money determined according to an operating rate of the resources is reduced.

SUMMARY OF THE INVENTION

Incidentally, in recent years, a computer system having hardware (accelerator) that carries out specific processing at high speed is attracting public attention. In this case, other than usual use fees for a CPU and a memory, a use fee for the accelerator is charged. With respect to the CPU and the memory, operating rates thereof are measured by an OS (operating system). However, with respect to the accelerator, only the allocated time and the operating time can be measured as one component.

Accordingly, it is considered that the use fee of the accelerator is determined from the allocated time and operating time of the accelerator.

However, the determination is not always appropriate. The reason is as follows.

In other words, what is expected by a user for the accelerator is processing that is carried out at higher speed than processing carried out by software. Therefore, it is desirable that the use fee of the accelerator be a counter value for acceleration. However, the acceleration by the accelerator is not constant. For example, the processing speed of the accelerator may decrease depending on a command or data to be processed. In this case, the allocated time or operating time of the accelerator may get longer. Therefore, it is considered that even if the accelerator cannot carry out processing at sufficiently high speed, the use fee of the accelerator will become expensive.

A charging assistant system that assists charging for use of an accelerator unit, which is one or more accelerators, includes an operation amount obtaining unit, an acceleration rate estimation unit, and a use fee determination unit. For each of one or more commands input into the accelerator unit, the operation amount obtaining unit obtains the amount of operation related to execution of the command from a response output from the accelerator unit for the command. For the one or more commands input into the accelerator unit, the acceleration rate estimation unit estimates an acceleration rate on the basis of command execution time that is time required for processing of the one or more commands, and one or more amounts of operation obtained for the one or more commands respectively. The use fee determination unit determines a use fee of the accelerator unit on the basis of the estimated acceleration rate.

According to the present invention, a use fee corresponding to a degree of acceleration by the accelerator unit can be determined.

BRIEF DESCRIPTION OF THE DRAWINGS

FIG. 4 is a drawing illustrating a configuration of a weighting table;

FIG. 5 is a drawing illustrating a configuration of a unit price table; and

DESCRIPTION OF THE PREFERRED EMBODIMENTS

Figure 1:
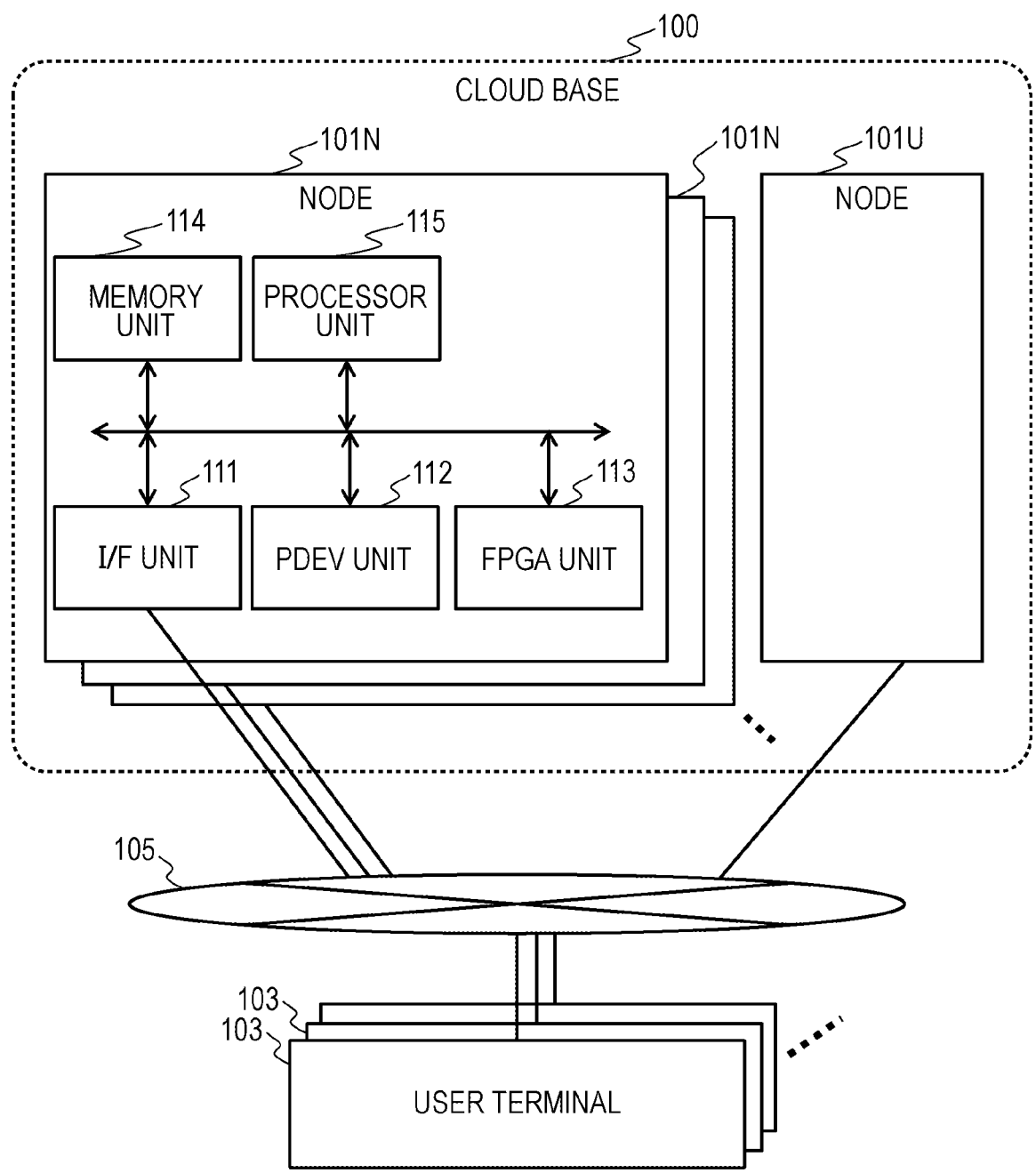
FIG. 1 is a diagram illustrating a hardware configuration of an entire system according to a first embodiment of the present invention.

In the following explanations, an "interface part" may be one or more communication interface devices. One or more communication interface devices may be one or more similar communication interface devices (for example, one or more Network Interface Cards (NIC)), or two or more heterogeneous communication interface devices (for example, NIC and Host Bus Adapter (HBA)).

In addition, in the following explanations, a "memory unit" may be one or more memories. At least one memory may be a volatile memory or a nonvolatile memory. The memory unit is mainly used at the time of processing by a processor unit.

Moreover, in the following explanations, a "PDEV unit" may be one or more PDEVs. "PDEV" means a physical storage device, and is typically a nonvolatile storage device (for example, an auxiliary storage device), for example, a Hard Disk Drive (HDD) or a Solid State Drive (SSD). The PDEV unit may be a RAID group. "RAID" is an abbreviation of Redundant Array of Independent (or Inexpensive) Disks.

Further, in the following explanations, the "processor unit" may be one or more processors. At least one processor is typically a microprocessor like a Central Processing Unit (CPU). However, at least one processor may be other kinds of processors like a Graphics Processing Unit (GPU). Each of one or more processors may be single-core or multi-core. A part of the processors may be a hardware circuit that performs a part or all of processing.

In addition, in the following explanations, there is a case where processing is explained using a "program" as a subject. However, since the program is executed by the processor unit to perform set processing using, for example, a memory unit and/or an interface unit as appropriate, the processing may be explained using the processor unit (or a device, or a system, having the processor unit) as a subject. The program may be installed in a device like a computer from a program source. The program source may be, for example, a program distribution server or a computer-readable (for example, non-temporary) recording medium. Further, in the following explanations, two or more programs may be realized as one program, or one program may be realized as two or more programs.

Furthermore, in the following explanations, in a case where similar elements are explained in a manner as to distinguish among the elements, reference numerals of the elements may be used (for example, a computing element 421A, a computing element 421B1, a computing element 421B2), whereas in a case where similar elements are explained without distinguishing among the elements, only a common numeral in the reference numerals of the elements may be used (for example, a computing element 421).

Some preferred embodiments of the present invention will be described in detail below with reference to the accompanying drawings. It should be noted that the present invention is not limited by the following explanations.

First Embodiment

FIG. 1 is a diagram illustrating a hardware configuration of the entire system according to the first embodiment of the present invention.

One or more user terminals 103 and a cloud base 100 are connected to a communication network 105 such as Internet.

Each of the one or more user terminals 103 is a computer (for example, a personal computer or a smart phone) of a user (typically, a so-called end user).

The cloud base 100 is an example of a computer system, and is a system that provides a cloud service. The "computer system" may be at least one of one or more computers, for example, at least one of a server system and a storage system. The "server system" may be one or more physical servers (for example, a cluster of a server), or may include at least one virtual server (for example, a Virtual Machine (VM)). In addition, the "storage system" may be one or more physical storage devices, or may include at least one virtual storage device (for example, a Software Defined Storage (SDS)).

The cloud base 100 includes a plurality of (or one) nodes (computers) 101. In the present embodiment, the plurality of nodes 101 include a node 101N that executes processing corresponding to a request from the user terminal 103, and a node 101U that manages a user. However, such a distinction may be eliminated.

Each of the nodes 101 includes an I/F unit (interface unit) 111, a PDEV unit 112, a Field-Programmable Gate Array (FPGA) unit 113, a memory unit 114, and a processor unit 115 connected to these units. The FPGA unit 113 may be excluded from a part of the nodes 101 (for example, the node 101U). The FPGA unit 113 is an example of an accelerator unit, and includes one or more FPGAs. The FPGA is an example of a Programmable Logic Device (PLD), and is an example of an accelerator. In other words, in the present embodiment, an accelerator is realized by FPGAs.

Figure 2:
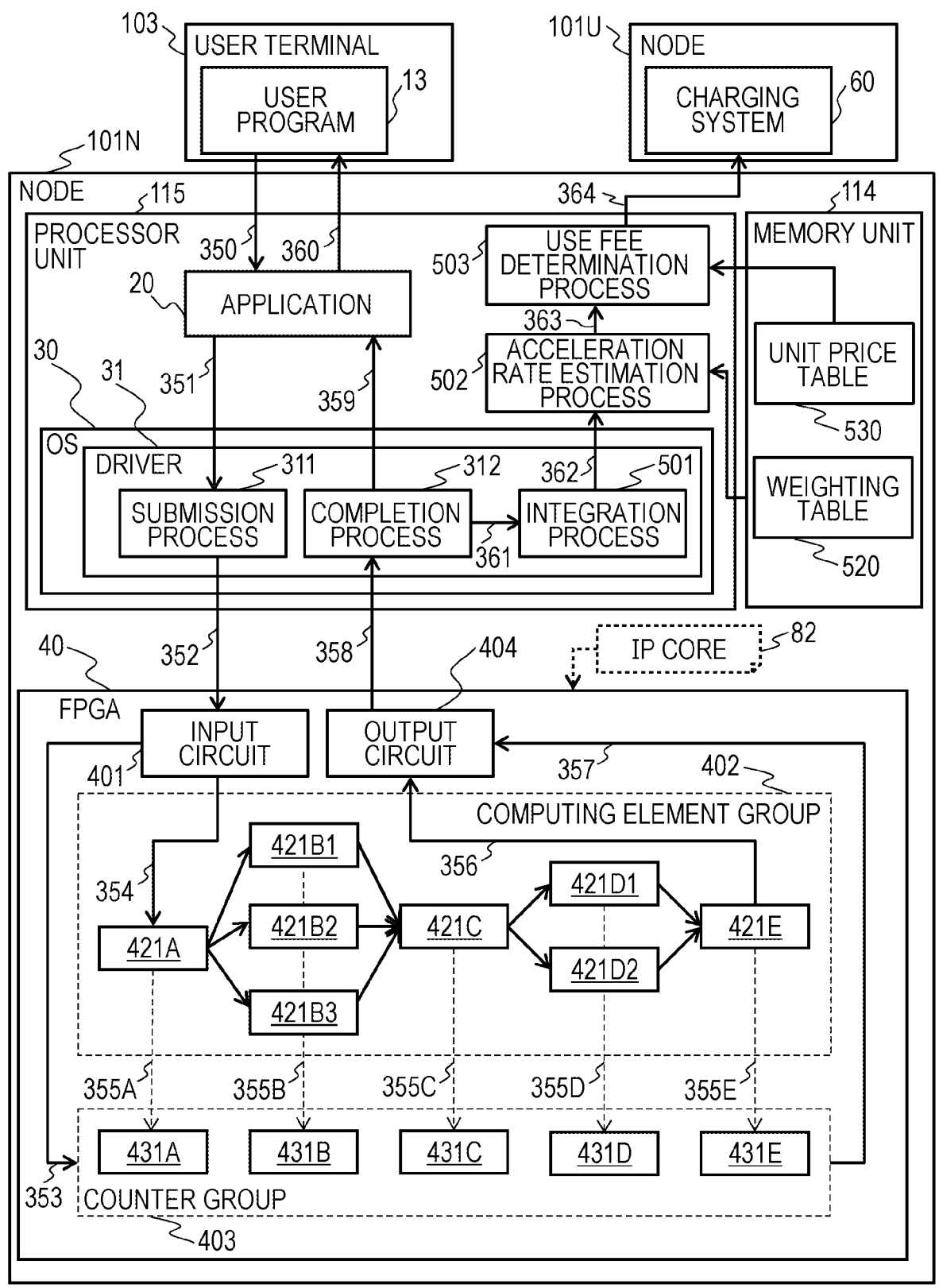
FIG. 2 is a functional block diagram illustrating the entire system according to the first embodiment.

FIG. 2 is a functional block diagram illustrating the entire system according to the first embodiment.

A FPGA 40 corresponds to the FPGA unit 113. In other words, in the present embodiment, the FPGA unit 113 includes one FPGA 40. A block in the FPGA 40 shown in the figure is a hardware functional block. An application (application program) 20, an OS (operating system) 30, an acceleration rate estimation process 502, and a use fee determination process 503, which are shown in the figure, are programs that each operate on the processor unit 115. A driver 31 of the FPGA 40 is executed on the OS 30. The driver 31 is also a program that operates on the processor unit 115. In addition, a submission process 311, a completion process 312, and an integration process 501, which are included in the driver 31, may be programs. A user program 13 in the user terminal 103 is a program that is executed in a processor unit (not illustrated) in the user terminal 103. A charging system 60 in the node 101U is a program that is executed in the processor unit 115 of the node 101U.

In the present embodiment, in a case where the application 20 receives a processing request from the user program 13, the application 20 carries out processing of the request. In order to offload partial processing of the processing to the FPGA 40, the application 20 is capable of issuing a command of the partial processing. In the present embodiment, since a use fee of the FPGA 40 is paid attention to, no mention is made of use fees of elements other than the FPGA 40 (for example, the processor unit 115, the memory unit 114 and the application 20).

The FPGA 40 (hardware functional block (circuit) shown in the figure) is built by loading an Intellectual Property (IP) core 82 into an early-stage FPGA. The IP core 82 (for example, a configuration file) is loaded into the early-stage FPGA by, for example, the driver 31 so as to build a hardware functional block (circuit) shown in the figure. A circuit in the FPGA 40 may be configured by combining a dedicated Large Scale Integration (LSI) (for example, Application Specific Integrated Circuit (ASIC)) and a general-purpose LSI.

The FPGA 40 (built circuit) includes an input circuit 401, a computing element group 402, a counter group 403, and an output circuit 404.

A command that has been output from the driver 31 (output by the submission process 311) is input into the input circuit 401.

The computing element group 402 includes one or more computing elements 421. In order to achieve high-speed processing, the computing element group 402 has a pipe line configuration or a parallel configuration. According to an example of FIG. 2, the computing element group 402 includes a plurality of kinds of computing elements 421A to 421E that are cascade connected. A "kind of computing element" may depend on at least one of a kind of computation (for example, arithmetic operation, comparison operation), computing power (for example, scale), and an operation load. The computing element group 402 includes one first type computing element 421A, three second type computing elements 421B1 to 421B3 that are arranged in parallel, one third type computing element 421C, two fourth type computing elements 421D1 and 421D2 that are arranged in parallel, and one fifth type computing element 421E. In this manner, five stage pipe lines from the first type computing element 421A to the fifth type computing element 421E are configured as a whole. Other configurations may be employed as a configuration of the computing element group 402. For example, as an alternative to operating all of the computing elements 421 in the computing element group 402 at the time of each command, a part of the computing elements 421 may be maintained in a non-operational state depending on a command. A result of processing of a command is output from the computing element croup 402 (in the example shown in the figure, the computing element 421E).

A counter group 403 is provided to measure the amounts of operation of the computing elements 421. In other words, counters 431 that count the amounts of operation for respective kinds of the computing elements are provided. According to the example of FIG. 2, five counters 431A to 431E that correspond to five kinds of computing elements respectively are provided. The amounts of operation of the computing elements 421 may change depending on a kind of a command and contents of data. In addition, in the present embodiment, a weighting factor (weight) of a count value differs depending on a kind of the computing element 421. In other words, if a kind of the computing element 421 is the same, a weighting factor of a count value is the same. Therefore, in the present embodiment, the counters 431 are provided for respective kinds of the computing elements 421. The counters 431 may be provided according to the relationship between the weighting factor of the count value and the computing element 421. The count value of the counter 431 may be the number of clocks obtained when the computing element 421 corresponding to the counter 431 performs effective computation. A count value of each counter 431 in the counter group 403 is output from the counter group 403.

For each command, the output circuit 404 obtains a processing result output from the computing element group 402 with respect to the command, and a count value (one or more count values) output from the counter group 403 with respect to the command, and then outputs a response in which the processing result is associated with the count value. The response is output to the driver 31.

Figure 3:
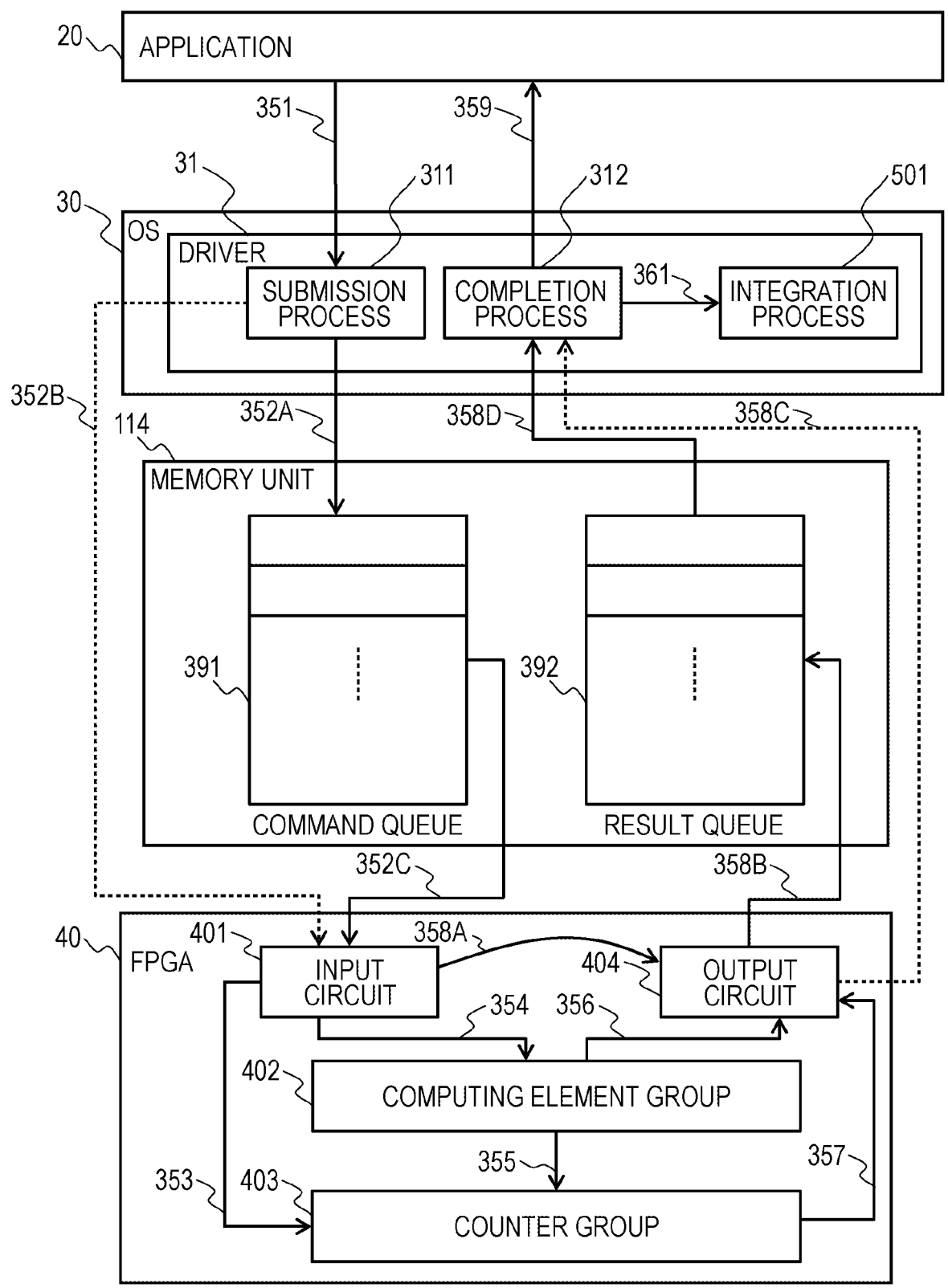
FIG. 3 shows exchanges between FPGA and the driver.

As described below with reference to FIG. 3, exchanges between the FPGA 40 and the driver 31 are carried out through the queue 391 and 392 that are provided in the memory unit 114.

The memory unit 114 stores the weighting table 520 and the unit price table 530.

The weighting table 520 indicates the relationship between the counter 431 (count value) and a weighting factor. More specifically, as shown in FIG. 4, the weighting table 520 stores, for each counter 431, information including the counter ID 41 and the weighting factor 42. The counter ID 41 indicates an ID of the counter 431. The weighting factor 42 indicates a value to be substituted as a weighting factor. In the present embodiment, as described above, the counters 431 are provided for respective kinds of the computing elements. Accordingly, the weighting table 520 shows weighting factors of count values corresponding to the respective kinds of the computing elements. It should be noted that each weighting factor may be a value determined beforehand by experiment or the like.

The unit price table 530 indicates the relationship between an estimated acceleration rate and a unit price. More specifically, as shown in FIG. 5, the unit price table 530 stores, for each range of an estimated acceleration rate r, information including an acceleration rate range 51 and a unit price 52. The acceleration rate range 51 indicates a range (at least one of an upper limit and a lower limit) of the estimated acceleration rate r. The unit price 52 indicates a value to be substituted as a unit price (a use fee per unit time).

A process flow performed in the present embodiment will be described below with reference to mainly FIG. 2 (with reference to FIGS. 3 to 5 as appropriate).

When the application 20 receives a processing request from the user program 13 (arrow 350), the APP 20 processes the processing request according to contents of the request. In this case, if the application 20 determines that the processing should be processed by the FPGA 40, the application 20 requests, through the driver 31 (the driver 31 of the FPGA 40) that is a part of the OS 30, the FPGA 40 to process the processing (arrow 351). For example, an ID of a user (account) who uses the FPGA 40 is specified in the processing request. Therefore, the integration process 501 described later integrates a count value on a user (account) basis. In the following explanations, a user of the user program 13, who has issued a processing request, is referred to as a "target user".

When the driver 31 receives the processing request from the application 20, the submission process 311 inputs a command into the FPGA 40 (arrow 352). More specifically, as shown in FIG. 3, for example, the submission process 311 stores a command into a command queue 391 in the memory unit 114 (arrow 352A), and notifies the input circuit 401 of storing of the command (arrow 352B). Subsequently, the input circuit 401 that has received the notification obtains the command from the command queue 391 (arrow 352C). The command specifies, for example, an address of a storing destination storage area (an area in the memory unit 114) in which a response to the command is stored. Thus, the response will be stored in the storage area indicated by the specified address.

In a case where the input circuit 401 of the FPGA 40 has obtained a command, the input circuit 401 resets the counters 431A to 431E (arrow 353). Subsequently, the input circuit 401 inputs the command into the computing element group 402 (the computing element 421A) (arrow 354), and the computing elements 421A to 421E operate to execute the command. The counters 431A to 431E count the operation of the computing elements 421A to 421E (arrows 355A to 3553 (arrow 355 of FIG. 3)). For example, the counter 431A counts the operation of the computing element 421A (arrow 355A). The counter 431B counts the operation of the computing elements 421B1 to 421B3 (arrow 355B). The count value of the counter 431B is equivalent to the sum total of the operation of the computing elements 421B1 to 421B3.

When the execution of the command ends, the computing element Group 402 (the computing element 421E) outputs a processing result of the command to the output circuit 404 (arrow 356). The output circuit 404 that has received the execution result obtains count values from the respective counters 431 (arrow 357). The output circuit 404 returns, to the driver 31, a response that includes the processing result and the count values of the respective counters 431 (arrow 358). More specifically, as shown in FIG. 3, for example, the output circuit 404 receives, from the input circuit 401, an address specified in the processed (executed) command (arrow 358A), stores the response in an area (an area of a response queue 392 in the memory unit 114) indicated by the address (arrow 358B), and notifies the driver 31 of storing of the response (arrow 358C). The completion process 312 of the driver 31 obtains the response from the area (the area of the response queue 392 in the memory unit 114) indicated by the address specified by the processed command (arrow 358D).

The completion process 312 of the driver 31 returns, to the application 20, the obtained processing result that is being responded (arrow 359). The application 20 returns the response based on the processing result to the user program 13 (arrow 360).

In addition, the completion process 312 passes the count values of the respective counters 431 to the integration process 501 (arrow 361).

With respect to the target user (account), the integration process 501 manages temporary integrated values of the respective counters 431 (integrated values of the count values). The integration process 501 integrates count values obtained this time into the temporary integrated values for the respective counters 431.

At every timing of charging, the integration process 501 (an example of the operation amount obtaining unit) transmits the integrated values of the respective counters 431 (the integrated values of the count values) to the acceleration rate estimation process 502 (arrow 362). As the timing of charging, charging may be performed on a command basis (every time a response is obtained) or on a predetermined period basis (for example, every time, every day, or every month). The timing of charging may be arbitrary timing based on the use contract or the like of the FPGA unit 113.

The acceleration rate estimation process 502 (an example of the acceleration rate estimation unit) estimates an acceleration rate on the basis of the integrated values of the respective counters 431, and then notifies the use fee determination process 503 of the estimated acceleration rate (arrow 363). More specifically, the acceleration rate estimation process 502 refers to the weighting table 520, subjects the integrated values of the counters 431A to 431E to linear combination as represented by equation 1, and divides by the command execution time, thereby estimating an average acceleration rate. In the FPGA 40, because of the pipe line configuration or the parallel configuration, the number of operations per unit time (the number of times computation is performed) is larger than that of software that is successively processed on the processor unit 115. Therefore, an average acceleration rate can be estimated by counting the operation (the number of times computation is performed), and then by dividing the count by the command execution time.

$$r = \frac{\sum_i (w_i \cdot c_i)}{t}$$ [Equation 1]

Incidentally, t is the command execution time. More specifically, this "command execution time" is an accumulated value of the execution time of commands processed for the target user from the timing of charging last time until the timing of charging this time. The execution time after the command may be measured by a timer (not illustrated) of the OS 30 (for example, the time from the issuance of a command until a response is obtained), or may be measured by a timer (not illustrated) of the FPGA 40 (for example, the time from obtaining of a command until a response is output).

$c_i$ is an integrated value (an integrated value of the count value). $w_i$ is a weighting factor. The acceleration rate estimation process 502 refers to the weighting table 520 (FIG. 4), and obtains weighting factors $w_i$ of the respective counters 431.

r is an estimated acceleration rate.

In addition, the use fee determination process 503 (an example of the use fee determination unit) determines a use fee of the FPGA 40 on the basis of an estimated acceleration rate r, and notifies the charging system 60 of the determined use fee (arrow 364).

More specifically, for example, the use fee determination process 503 refers to the unit price table 530, and determines a unit price k corresponding to the estimated acceleration rate as shown in FIG. 2.

$$k = f(r)$$ [Equation 2]

Subsequently, as represented by equation 3, the use fee determination process 503 determines a use fee a of the FPGA 40 by the product of the determined unit price k and the command execution time t.

$$a = k \cdot t$$ [Equation 3]

The determined use fee (settled use fee) is transmitted to the charging system 60 as described above. The charging system 60 charges the user for the notified use fee (or the amount of money obtained by adding or subtracting a certain amount of money to or from the use fee)

As described above, according to the present embodiment, the IP core 82 for building a circuit for measuring the amount of operation required to process the input command is loaded into the early-stage FPGA, thereby building the FPGA 40 having the circuit. In other words, a technical means for measuring the amount of operation required to process the command of the FPGA 40 is built. The circuit in the FPGA 40 measures the amount of operation of the processing of the command input into the FPGA 40, and outputs a response with which the count value that is a measurement value of the amount of operation is associated. The acceleration rate estimation process 502 estimates an acceleration rate (that is to say, a degree of acceleration) of the FPGA 40 on the basis of the integrated value of the count value, and the use fee determination process 503 determines a use fee on the basis of the estimated acceleration rate r. In this manner, the technical means realizes the estimation of the degree of acceleration of the FPGA 40, and consequently a fee corresponding to the degree of acceleration of the FPGA 40 can be calculated as the use fee of the FPGA 40. As the result, the user can expect maintenance of cost-effectiveness. For example, in a case where the degree of acceleration is relatively high, a high use fee can be provided; and in a case where the degree of acceleration is relatively low (for example, in a case where the degree of acceleration is not so high), a low use fee can be provided.

Incidentally, by doubly executing a job (in the above-described example, processing according to the processing request from the user program 13) (by executing only the processor unit 115, and both the processor unit 115 and the FPGA 40), a degree of acceleration of using the FPGA 40 (a degree of acceleration in comparison with the execution of only the processor unit 115) can be calculated. However, it cannot be said that the double execution of the job is desirable at least in the environment of the present application (during the operation of actual service).

In addition, it is considered that on the basis of the experimental result in a development environment or the like, the degree of acceleration is estimated from attributes of a command, data and the like input into the FPGA 40. However, in order to achieve this purpose, analyses of the input command, data and the like are required, and therefore there is a concern about an increasing load. Further, it is not always possible to achieve results in accordance with the experimental results.

Therefore, as with the present embodiment, it is useful to build, in the FPGA, a circuit (technical means) for measuring the amount of operation required to process the input command, and to determine a use fee corresponding to an acceleration rate based on the amount of operation until the timing of charging.

Moreover, in the present embodiment, in the weighting table 520 (FIG. 4), a weighting factor of a counter corresponding to the kind of computing element, the operation load of which is relatively low (for example, computation is relatively easy), may be lower than a weighting factor of a counter corresponding to the kind of computing element, the operation load of which is relatively high (for example, computation is relatively complicated). This is because a user considers that executing computation, the operation load of which is relatively low, at high speed has a value lower than executing computation, the operation load of which is relatively, and thus considers that it is desirable that the relatively low use fee be calculated.

Further, in the present embodiment, in the unit price table 530 (FIG. 5), the unit price 52 (for example, $k_1$) corresponding to the relatively low acceleration rate range 51 may be lower than the unit price 52 (for example, $k_2$) corresponding to the relatively high acceleration rate range 51. This is because the degree of acceleration per unit time is relatively low, with the result that there is a possibility that the command execution time will get relatively long.

Furthermore, in the present embodiment, the amount of operation of the computing element 421 is employed as an example of the amount of operation. However, it is considered that employing at least the amount of operation of the computing element 421 is effective. This is because the degree of acceleration of the FPGA 40 is compared with that of the processor unit 115. It should be noted that in addition to the amount of operation of the computing element 421, the consumed storage capacity of a memory (not illustrated) in the FPGA 40 may be employed.

Second Embodiment

A second embodiment of the present invention will described. In that case, points of difference between the first and second embodiments will be mainly explained, and explanations of points common to the first embodiment will be omitted or simplified.

Figure 6:
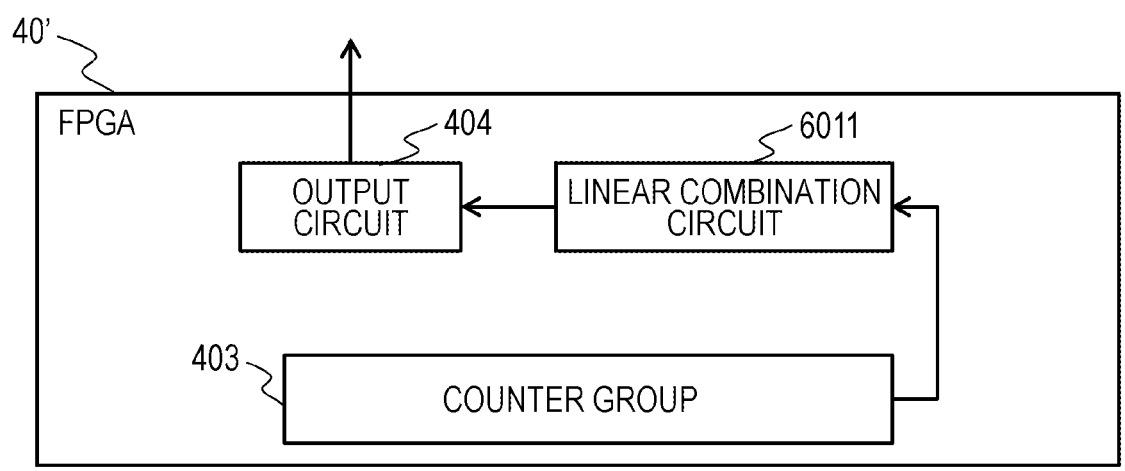
FIG. 6 shows a part of FPGA according to a second embodiment of the present invention.

FIG. 6 shows a part of FPGA according to the second embodiment of the present invention.

An FPGA 40' according to the second embodiment includes a linear combination circuit 6011 that performs linear combination calculation of a plurality of count values from the counter group 403. The calculation of the linear combination circuit 6011 is realized by configuring a part of sigma calculation in equation 1 to be hardware. The output circuit 404 outputs a response that is associated with a result of linear combination. Consequently, processing loads of the integration process 501 and the acceleration rate estimation process 502 are reduced. In addition, the amount of data that is output from the output circuit 404 of the FPGA 40' to the completion process 312 of the driver 31 as notification is reduced, and therefore an improvement in performance can be expected.

Incidentally, in the present embodiment, the integration process 501 of the driver 31 becomes integration processing of a single value after the linear combination. The acceleration rate estimation process 502 divides the integrated value of the linear combination value by the execution time, thereby estimating an acceleration rate.

Although several embodiments have been described above, it is to be understood that such embodiments are merely illustrative for explaining the present invention, and are not intended to limit the scope of the present invention to these embodiments. The present invention can also be carried out in various other modes.

For example, in order to simplify the explanation, the FPGA unit 113 includes one FPGA 40. However, the FPGA unit 113 may include a plurality of FPGAs 40. The FPGAs 40 may cooperate with each other in the same node 101. Alternatively, the two or more FPGAs 40 in the two or more nodes 101 may cooperate with each other.

In addition, for example, the integration process 501 may be provided outside the driver 31. Further, at least one of the acceleration rate estimation process 502, the use fee determination process 503 and the charging system 60 may be provided inside the driver 31

Moreover, for example, a package of the weighting table 520, the unit price table 530 and the IP core 82 may be installed in the node 101, the tables 520 and 530 may be stored in the memory unit 114, and the IP core 82 may be loaded into the FPGA by, for example, the driver 31.

Further, for example, after performing the following on a command basis: estimating an acceleration rate on the basis of a count value; determining a use fee on the basis of the estimated acceleration rate; and integrating the use fee into a use fee integrated value up to this point of time, the integrated value of the use fee may be transmitted to the charging system 60 in the timing of charging.

Furthermore, for example, the following may be performed on a command basis: estimating an acceleration rate on the basis of a count value; and updating an estimated acceleration rate (for example, an average value) up to this point of time on the basis of the acceleration rate. The following may be performed in the timing of charging: determining a use fee on the basis of the estimated acceleration rate; and transmitting the determined use fee to the charging system 60.

What is claimed is:

1. A charging assistant system comprising:
a processor; and
at least one field programmable gate array (FPGA) comprising a plurality of different kinds of computing elements, a counter group, linear combination circuit, and an output circuit, wherein
the counter group comprises a plurality of counters corresponding to each of the plurality of computing elements, each counter being configured to count a respective number of operations executed by the respective computing element for processing each of one or more respective input commands input into the respective computing element, and send each count to the linear combination circuit,
the linear combination circuit is configured to receive the respective counts from each counter and estimate an acceleration rate of the at least one FPGA by calculating a summation of each respective count multiplied by a respective weighting factor and dividing the summation by an amount of time for the at least one FPGA to execute all of the input commands, wherein a different weighting factor is associated with each different kind of computing element,
the output circuit is configured to output the estimated acceleration rate to a driver of the processor, and
the processor is configured to determine a use fee of the at least one FPGA based on the estimated acceleration rate received from the output circuit.

2. The charging assistant system according to claim 1, wherein:
the at least one FPGA further includes an input circuit; and
the computing elements include a first computing element group.

3. The charging assistant system according to claim 1, wherein the processor is further configured to:
determine a unit price that is a use fee per unit time in accordance with the estimated acceleration rate; and
determine the use fee based on the determined unit price and the amount of time for the at least one FPGA to execute all of the input commands.

4. The charging assistant system according to claim 1, further comprising an Intellectual Property (IP) core for configuring the one or more FPGAs, wherein the charging assistant system includes a Programmable Logic Device (PLD) in which the one or more of the FPGAs is built by loading the IP core.

\* \* \* \* \*